United States Patent
Jammoussi et al.

(10) Patent No.: US 9,834,223 B2
(45) Date of Patent: Dec. 5, 2017

(54) DIAGNOSING AND SUPPLEMENTING VEHICLE SENSOR DATA

(71) Applicant: Ford Global Technologies, LLC, Dearborn, MI (US)

(72) Inventors: Hassene Jammoussi, Canton, MI (US); Pankaj Kumar, Dearborn, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 14/969,043

(22) Filed: Dec. 15, 2015

(65) Prior Publication Data
US 2017/0166219 A1 Jun. 15, 2017

(51) Int. Cl.
*G06F 19/00* (2011.01)
*B60W 50/04* (2006.01)
*G05B 15/02* (2006.01)
*G08G 1/01* (2006.01)
*G08G 1/048* (2006.01)
*G08G 1/0967* (2006.01)

(52) U.S. Cl.
CPC .......... *B60W 50/045* (2013.01); *G05B 15/02* (2013.01); *G08G 1/0112* (2013.01); *G08G 1/0116* (2013.01); *G08G 1/0125* (2013.01); *G08G 1/0141* (2013.01); *G08G 1/048* (2013.01); *G08G 1/09675* (2013.01); *G08G 1/096741* (2013.01); *G08G 1/096783* (2013.01); *G08G 1/096791* (2013.01); *B60W 2050/046* (2013.01)

(58) Field of Classification Search
CPC .......... G06F 7/00; G06F 19/00; G01M 17/00; B60Q 1/00; B60W 10/00; G05B 1/00
USPC .................. 701/29.1, 29.7, 29.8, 30.4, 33.4; 340/459, 438, 439
See application file for complete search history.

(56) References Cited

U.S. PATENT DOCUMENTS

| | | | |
|---|---|---|---|
| 5,675,518 A | 10/1997 | Kuroda et al. | |
| 8,947,531 B2 | 2/2015 | Fischer | |
| 2009/0096599 A1 | 4/2009 | Kranz | |
| 2009/0240390 A1 | 9/2009 | Nenadic et al. | |

(Continued)

FOREIGN PATENT DOCUMENTS

| | | |
|---|---|---|
| GB | 2524393 A | 9/2015 |
| GB | 2543930 A1 | 5/2017 |
| JP | 2639163 | 8/1997 |

(Continued)

OTHER PUBLICATIONS

UK Search Report 16481P; GB Appl 1621089.0; dated Jun. 5, 2017; 6 pages.

*Primary Examiner* — Gertrude Arthur Jeanglaude
(74) *Attorney, Agent, or Firm* — Frank A. MacKenzie; Bejin Bieneman PLC (57) ABSTRACT

A system includes a processor programmed to receive a first data value from a first data collector as an input to operate a first vehicle. The processor is further programmed to determine to exclude the first data value as the input to operate the first vehicle. The computer is further programmed to receive a second data value from a second data collector as the input to operate the vehicle, the second data value being provided by a source remote to the first vehicle; and actuate a first vehicle component based in part on the second data value.

22 Claims, 4 Drawing Sheets

(56) References Cited

U.S. PATENT DOCUMENTS

2015/0112800 A1* 4/2015 Binion ............... G06Q 30/0255
  705/14.53
2015/0234384 A1 8/2015 Taira et al.

FOREIGN PATENT DOCUMENTS

| JP | 2010176283 | | 8/2010 |
|----|------------|---|--------|
| KR | 20130046818 | A | 5/2013 |
| WO | 2015156795 | A1 | 10/2015 |

* cited by examiner

DIAGNOSING AND SUPPLEMENTING VEHICLE SENSOR DATA

BACKGROUND

Vehicles are typically dependent on multiple types of data for proper operation. Sensors included in a vehicle such as temperature sensors, humidity sensors, pressure sensors, accelerometers, gyroscopes, cameras, radar, lidar, etc., can provide vehicle data. Vehicles additionally can sometimes receive data from external sources such as global positioning systems (GPS). As vehicles become increasingly complex, dependency on data is also increasing. Vehicle data collectors and communications devices, however, sometimes fail, resulting in data being unavailable and/or inaccurate.

DESCRIPTION

Introduction

Sharing data between vehicles and road infrastructure via radio frequency communications such as dedicated short range communications (DSRC) allows vehicles to evaluate, e.g., diagnose one or more conditions and/or faults of, on-board sensors by comparing data from remote sensors with data from on-board sensors. Additionally, data received from a first data collector, e.g., an on-board sensor or first on-board receiver, may be replaced with data from a second data collector, e.g., a remote sensor, or second on-board receiver, when data received from the first data collector is determined to be unavailable or inaccurate.

System Elements

Figure 1:
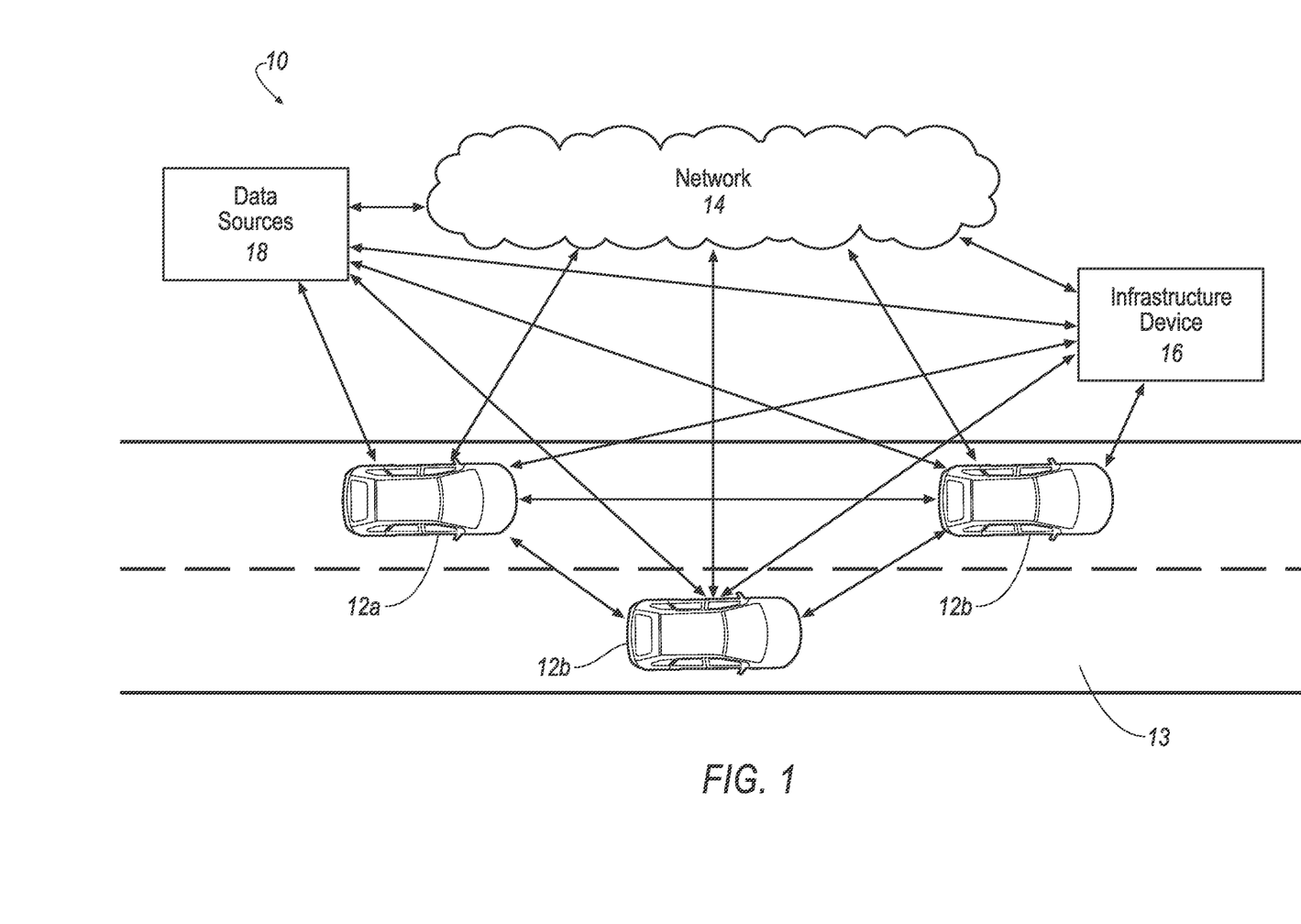
FIG. 1 is diagram of an exemplary system for supplementing vehicle sensor data.

A system 10 for sharing data between vehicles and road infrastructure devices via radio frequency communications such as dedicated short range communications (DSRC) is shown in FIG. 1. The system 10 includes a host or first vehicle 12a, and one or more second vehicles 12b which may be operating on a highway 13. The system 10 may further include a network 14, one or more infrastructure devices 16 and one or more data sources 18. The host or first vehicle 12a, as used herein, may be defined as a vehicle which is evaluating and supplementing local data with other, remote data. The one or more second vehicles 12b, as used herein, may be defined as vehicles other than the first vehicle 12a.

The first vehicle 12a and one or more second vehicles 12b (collectively vehicles 12) may communicate directly with each other, for example via short range communications such as dedicated short range communications (DSRC). The vehicles 12 may further communicate with each other indirectly, for example via the network 14, or via the infrastructure device 16.

The first vehicle 12a is generally a land-based vehicle having three or more wheels, e.g., a passenger car, light truck, etc. As described in additional detail below, the first vehicle 12a includes a computer. The first vehicle 12a computer may receive data from one or more sensors included in the vehicle (local data) and actuate one or more vehicle components under control of the computer. Actuating a vehicle component under control of the computer, as used herein, may include a vehicle computer sending instructions to a vehicle controller, and the vehicle controller, based on the instructions, actuating a component in the first vehicle 12a. For example, based on an air temperature value, the first vehicle computer may send an instruction to an engine controller to adjust a valve associated with air intake. The engine controller may then control an electric motor to change a valve position, e.g., in a known manner.

The first vehicle 12a computer may additionally access data from sensors in second vehicles 12b, the infrastructure device 16, or the data sources 18 (collectively remote data). Based on the remote data, the first vehicle 12a computer may evaluate the local data. Additionally, the first vehicle 12a computer may supplement or replace unavailable and/or inaccurate local data with the remote data. The data may be received, for example, via DSRC communications or other radio frequency communications between the first vehicle 12a and the second vehicles 12b, or between the first vehicle 12a and the infrastructure device 16.

In some cases, a portion of a communications circuit within the first vehicle 12a, e.g., a first receiver in the communications circuit may fail. Due to the failed first receiver, remote data received via the first receiver may not be available for use in determining first vehicle 12a operations. In such cases, the first vehicle 12a computer may activate, e.g., a second receiver, in order to receive the remote data. The second receiver in the first vehicle 12a may receive the data indirectly, i.e., via an intermediate communications circuit. An intermediate communications circuit is defined herein as a communications circuit that receives communications from a first communications circuit, e.g., from a data source 18, and relays the communications to a second communications circuit, for example a communications circuit in the first vehicle 12a. The intermediate communications circuit may receive the communications according to a first communications protocol, e.g., WiFi or satellite communications, and communicate with the first vehicle 12a according to a second communications protocol, e.g., DSRC.

For example, the first receiver, when operational, may receive data directly from a data source 18. Receiving communications directly is defined herein as receiving the communications without the use of an intermediate communications circuit. Upon determining that the first receiver failed, the first vehicle 12a computer may activate the second receiver to receive the data, which may receive the data indirectly, i.e., via an intermediate communications circuit. The intermediate communications circuit may be included, for example, in the infrastructure device 16 or in a second vehicle 12b. The data source 18 may transmit the data to the communications circuit in the infrastructure device 16 or second vehicle 12b, which may forward the data to the second receiver in the first vehicle 12a.

The network 14 represents one or more mechanisms by which the one or more vehicles 12, one or more infrastructure devices 16 and one or more servers 18 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

The infrastructure device 16 may be, for example, a land based station such as an electronic sign, traffic light, traffic cam, truck weighing station, etc. The infrastructure device 16 includes a communications circuit for communicating with one or more vehicles 12, the network 14, and the data sources 18. As described in additional detail below, the infrastructure device 16 additionally includes a computer, and may include sensors. The infrastructure device 16 computer may, for example, receive data from the sensors included in the infrastructure device 16, and provide the data to a first vehicle 12a. The infrastructure device 16 computer may further, for example, receive data from a second vehicle 12b, store the data, and provide the data to the first vehicle 12a. Still further, the infrastructure device 16 computer may receive data, for example from the data source 18, and provide the data to a first vehicle 12a and/or second vehicle 12b, for example via a DSRC connection.

Each of the one or more data sources 18 includes a memory and one or more processors configured to perform programs, i.e., sets of computer-executable instructions, stored in the memory. The data source 18 includes one or more communications circuits as are known for communicating with the network 14. The data source 18 computer may be programmed, for example, to provide map data, weather data, global position data, etc. to the first vehicle 12a, one or more second vehicles 12b, and/or infrastructure device 16 via the network 14.

Figure 2A:
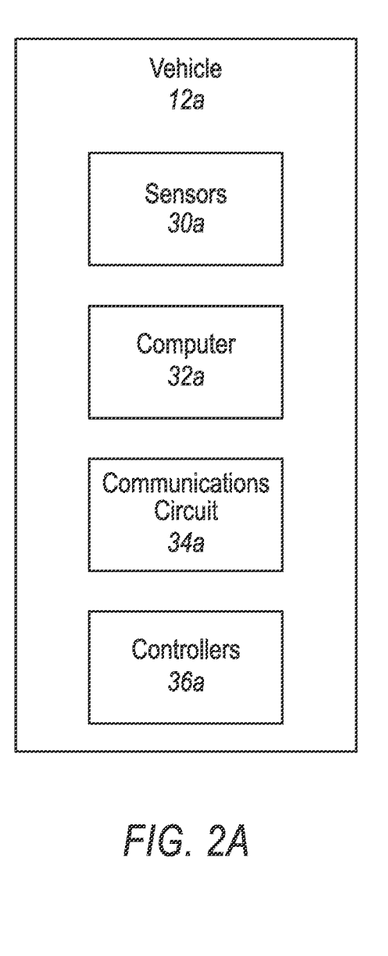
FIG. 2a is a block diagram of an exemplary first vehicle for the system of FIG. 1.

As shown in FIG. 2a, the first vehicle 12a includes one or more sensors 30a, a computer 32a, a communications circuit 34a, and one or more controllers 36a.

The one or more sensors 30a collect data related to the first vehicle 12a and the environment in which the first vehicle 12a is operating. By way of example, and not limitation, sensors 30a may include e.g., thermometers, barometers, humidity sensors, altimeters, cameras, lidar, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors may be used to sense the environment in which the vehicle is operating such as weather conditions, the grade of a road, the location of a road, obstacles, traffic signs, neighboring vehicles, etc. The sensors may further be used to collect dynamic vehicle 12a data related to operations of the vehicle such velocity, yaw rate, steering angle, engine speed, brake pressure, oil pressure, the power level applied to controllers in the vehicle, connectivity between components, etc.

The communications circuit 34a may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g., encoding functions, may be realized via firmware.

The types of wireless communications may include WiFi communications, dedicated short range communications (DSRC), two-way satellite communications (e.g., emergency services), one way satellite communications (e.g., receiving digital audio radio broadcasts), AM/FM radio, etc. Additionally, the communications circuit 34a may be communicatively coupled to the computer 32a via, e.g., a wired network such as a controller area network (CAN) bus or local interconnect network (LIN) bus, as is known.

The one or more controllers 36a for the first vehicle 12a may include known electronic control units (ECUs) or the like including, as non-limiting examples, an engine controller, a seat controller, a power steering controller, a door lock controller, a door latch controller, a climate controller, a mirror adjustment controller, a seatbelt controller, a brake controller, etc. Each of the controllers 36a may include respective processors and memories, one or more actuators, and one or more sensors, as is known. The controllers 36a may be configured to receive instructions from the computer 32a and control an actuator based on such instructions. For example, a door lock controller may receive an instruction to unlock a door and may cause an actuator to unlock a lock associated with the door. The actuator may be, e.g., a motor, or a solenoid. Further, the controller 36a may include sensors. The sensors, may, e.g., detect the action of the actuator. For example, the door lock controller may detect the lock being in an unlocked condition. The controller 36a may provide data regarding the status of the lock to the computer 32a.

The computer 32a includes a processor and a memory. The memory includes one or more types of computer-readable media, and storing instructions executable by the processor for performing various operations, including as disclosed herein. Further, the computer 32a may include and/or be communicatively coupled to one or more other computers, including e.g., vehicle components such as the sensors 30a, communications circuit 34a and controllers 36a. Communications may be performed, e.g., via a controller area network (CAN) bus or local interconnect network (LIN) bus, etc., as is known.

The computer 32a may be programmed, as is known, to perform diagnostic tests and determine the operability of on-board systems such as on-board sensors 30a, on-board controllers 36a, and the on-board communications circuit 34a. The computer 32a may confirm, for example, that on-board systems are receiving power, have power consumption levels within pre-determined ranges, are providing outputs within expected pre-determined ranges, etc. Based on the diagnostic tests, the computer 32a may determine, for example, that a particular sensor 30a is consuming power at a level above a predetermined threshold. Accordingly, the computer 32a may determine that the sensor 30a is not operating properly and that the data received from the sensor 30a should be excluded from vehicle operations. As another example, the computer 32a may determine that a sensitivity of a receiver in the communications circuit 34a is below a pre-determined level. Based on the determination that receiver is not operating properly the computer 32a may determine that e.g., that the data received by the first vehicle 12a computer 32a via the receiver should be excluded from vehicle operations.

Figure 2B:
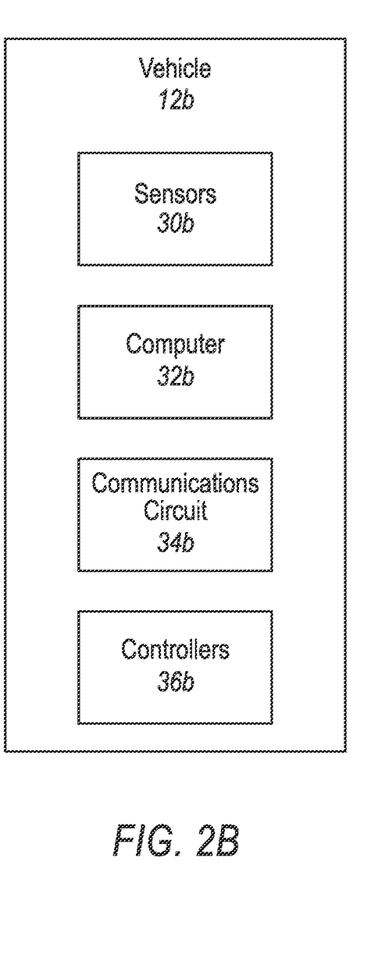
FIG. 2b is a block diagram of an exemplary second vehicle for the system of FIG. 1.
Figure 3:
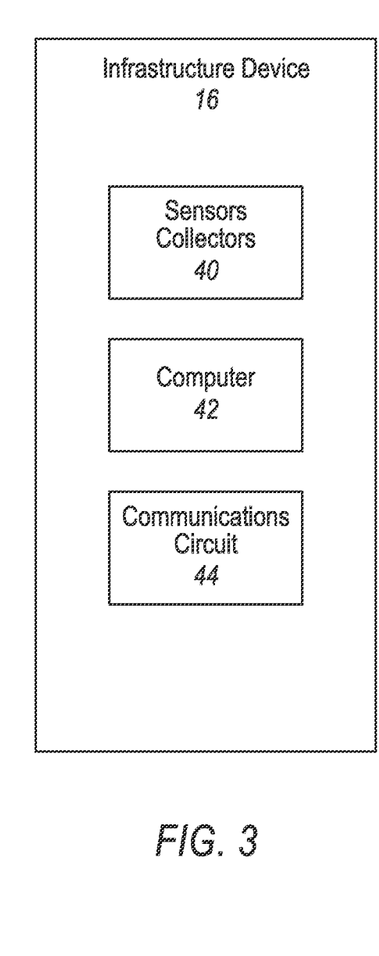
FIG. 3 is a block diagram of an exemplary infrastructure device for the system of FIG. 1.

The computer 32a may further be programmed to receive data from sensors 30b (FIG. 2b) in second vehicles 12b, data from sensors 40 in infrastructure devices 16, and data from data sources 18, and use the data to diagnose the quality of data from sensors 30a in the first vehicle 12a. Data from sensors 30b in second vehicles 12b, data from sensors 40 in infrastructure devices 16 and data from data sources 18 may be referred to collectively herein as remote data. Data received from sources included in the first vehicle 12a, such as data from sensors 30a and data from the controllers 36a, may be referred to as local data herein. Diagnosing local data as used herein may include determining whether the local data falls within expected pre-determined ranges, and may further include determining, based on a comparison with remote data, the likelihood that the local data is inaccurate and should be excluded from first vehicle 12a operations.

For example, the computer 32a may receive local data from a local sensor 30a indicating that the air temperature is 15° C. (Centigrade). A predetermined range for plausible air temperatures, based e.g., on the date of the measurement and the geographic location may be from −20° to 60° C. The computer may initially determine that the local data indicating an air temperature of 15° C. falls within the predetermine range of plausible temperatures. The computer 32a may further receive remote data from three second vehicles 12b in a same geographical area as the first vehicle 12a indicating that the air temperature is respectively 24°, 23° and 26°. The same geographic area may be defined as, for example, within one kilometer of the first vehicle 12a. Based on the remote data, and using statistical analysis as is known, the computer 32a may determine that the local data is most likely inaccurate and should be excluded from vehicle operations. Most likely inaccurate may be defined, for example, as a deviation of greater than three standard deviations from a mean value of the collected (e.g., remote and local) data.

The computer 32a may be programmed, based on the determination that local data should be excluded, to retrieve alternate data from other sources. For example, in the case that air temperature is used by an operation performed by an engine controller 36a, and the computer 32a determines, as described above, that the air temperature data received from the on-board sensor 30a is likely inaccurate, the computer 3a2 may substitute remote data. The substituted remote data may be, for example, the air temperature data received from a second vehicle 12b within the geographic range of the first vehicle 12a, or may be, for example, the average of the air temperature data received from two or more second vehicles 12b, etc.

Further, in a case that the computer 32a determines that for example, a receiver in the communications circuit 36a is not operating properly and that the remote data received by the receiver cannot be used, the computer 32a may receive the data via an alternate communications path.

For example, in the case that the computer 32a determines that a receiver in the communications circuit 34a for receiving traffic data from a data source 18 is not operating properly, the computer 32a may request to receive the traffic data indirectly, e.g., via the infrastructure device 16, or a second vehicle 12b. The infrastructure device 16 computer 42 or second vehicle 12b computer 32b may receive the traffic data from the data source 18, and provide the data, vie e.g. dedicated short range communications (DSRC) to the first vehicle 12a computer 32a. The computer 32a may then provide the traffic data to a controller 36a, for example a controller 36a used to determine and update a travel plan for the vehicle 12a.

Conversely, the computer 32a may be programmed to provide local data to second vehicles 12b and the infrastructure device 16. For example, the computer 32a may be programmed to identify that an infrastructure device 16 or second vehicle 12b is within a same geographical area, for example, within one kilometer. Upon determining that the infrastructure device 16 or second vehicle 12b is within the same geographic area, the computer 32a may transmit local data from one or more sensors 30a to the infrastructure device 16 computer 42 (FIG. 3) or second vehicle 12b computer 32b (FIG. 2b). The data may be a pre-determined set of data, for example environmental data such as air temperature, humidity, air pressure, etc. Alternatively, the first vehicle 12a may receive a request for the data from e.g., a second vehicle 12b computer 32b or the infrastructure device 16 computer 42, and provide the data.

As shown in FIG. 2b, the one or more second vehicles 12b may each include one or more sensors 30b, a computer 32b, a communications circuit 34b, and one or more controllers 36b. The one or more sensors 30b, the computer 32b, the communications circuit 34b and one or more controllers 36b may be analogous respectively to the one or more sensors 30a, the computer 32a, the communications circuit 34a and one or more controllers 36a included in the first vehicle 12a, as described herein.

The infrastructure device 16 may be a land based communications station, and may be associated with, for example, a traffic light, an electronic traffic sign, traffic monitoring devices (traffic cams), truck weighing station, etc. As shown in FIG. 3, the infrastructure device 16 may include one or more sensors 40, a computer 42 and a communications circuit 44.

The one or more sensors 40 may collect data related to the environment in which the infrastructure device 16 is located. By way of example, and not limitation, sensors 40 may include barometers, humidity sensors, altimeters, cameras, lidar, radar, ultrasonic sensors, infrared sensors, temperature sensors, hall sensors, optical sensors, etc. The sensors may be used to sense e.g., weather conditions, light conditions, road conditions (temperature of road surface, amount of snow on the road, etc.), traffic conditions (volume of traffic, speed of traffic), obstacles on the road, etc. The sensors 40 may provide the collected data to the computer 42.

The communications circuit 44 may include hardware, software, firmware, etc. and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g. encoding functions, may be realized via firmware, as is known.

The types of wireless communications may include WiFi communications, dedicated short range communications (DSRC), two-way satellite communications (e.g., emergency services), one way satellite communications (e.g., receiving digital audio radio broadcasts), AM/FM radio, etc. Additionally, the communications circuit 44 may be communicatively coupled to the computer 42 via, e.g., a wired network such as a controller area network (CAN) bus or local interconnect network (LIN) bus, as is known.

The computer 42 includes a processor and a memory. The memory includes one or more types of computer-readable media, and storing instructions executable by the processor for performing various operations, including as disclosed herein. Further, the computer 42 may include and/or be communicatively coupled to more than one other computer, including e.g., infrastructure 16 components such as the sensors 40 and the communications circuit 44. Communications may be performed, e.g., via a controller area network (CAN) bus or local interconnect network (LIN) bus, etc., as is known.

The computer 42 may be programmed to collect data from the sensors 40, and provide the data, e.g., to the computer 32*a* in the first vehicle 12*a*. For example, the computer 42, based on data from the sensors 40, may determine that the first vehicle 12*a* is within the same geographic area as the infrastructure device 16. As above, the same geographic area may be defined as within one kilometer of the infrastructure device 16. Based on the determination that the first vehicle 12*a* is within the same geographic area, the computer 42 may provide data to the first vehicle 12*a* computer 32*a*. The data may be, for example, weather data, traffic data, etc.

Additionally or alternatively, the computer 42 may provide the data upon receiving a request. The first vehicle 12*a* computer 32*a* may establish communications with the infrastructure device 16 computer 42, and request specific data. Upon receiving a request for specific data, the computer 42 of the infrastructure device 16 may collect the data, e.g., from the sensors 40, or from memory, and provide the data to the computer 32*a* in the first vehicle 12*a*.

The computer 42 may further be programmed to collect data from second vehicles 12*b*, and provide the data to the first vehicle 12*a*. For example, the infrastructure device 16 may be located near a highway, e.g., within a predetermined distance, e.g., 100 meters of the highway. As each of second vehicles 12*b* passes the infrastructure device 16, the infrastructure device 16 may collect data from the second vehicles 12*b*. Passing the infrastructure device 16 may be defined as traversing a section of the highway within a predetermined distance, e.g., 100 meters of the infrastructure device 16. For example, the infrastructure device 16 computer 42 may receive data related to weather conditions, such as air temperature, humidity, etc. from each second vehicle 12*b* as it passes the infrastructure device 16. As another example, the infrastructure device 16 computer 42 may collect data related to road traction (from, e.g., automatic traction control systems) from each second vehicle 12*b*. The infrastructure device 16 computer 42 may store the data from each vehicle second vehicle 12*b*, along with, for example a time stamp indicating when the data was received, a type of vehicle reporting the data, etc.

The data collected from the second vehicles 12*b* may also be provided to the first vehicle 12*a*.

The computer 42 may further be programmed to provide a communications link between two or more vehicles 12*a*, 12*b*, or the first vehicle 12*a* and a data source 18.

For example, the first vehicle 12*a* may detect that a receiver on the first vehicle 12*a* for receiving traffic data from the data source 18 is not operating properly. The first vehicle 12*a* may, e.g., via dedicated short range communications, request that the computer 42 of the infrastructure device 16 receive traffic data from the data source 18, and transmit the traffic data to the computer 32*a*. The computer 42 (in the infrastructure device 16) may establish a communications link with the data source 18, directly, or via the network 14. The computer 42 may receive the data from the data source 18, and forward the data to the first vehicle 12*a* computer 32*a* via DSRC.

Exemplary Process Flows

Figure 4:
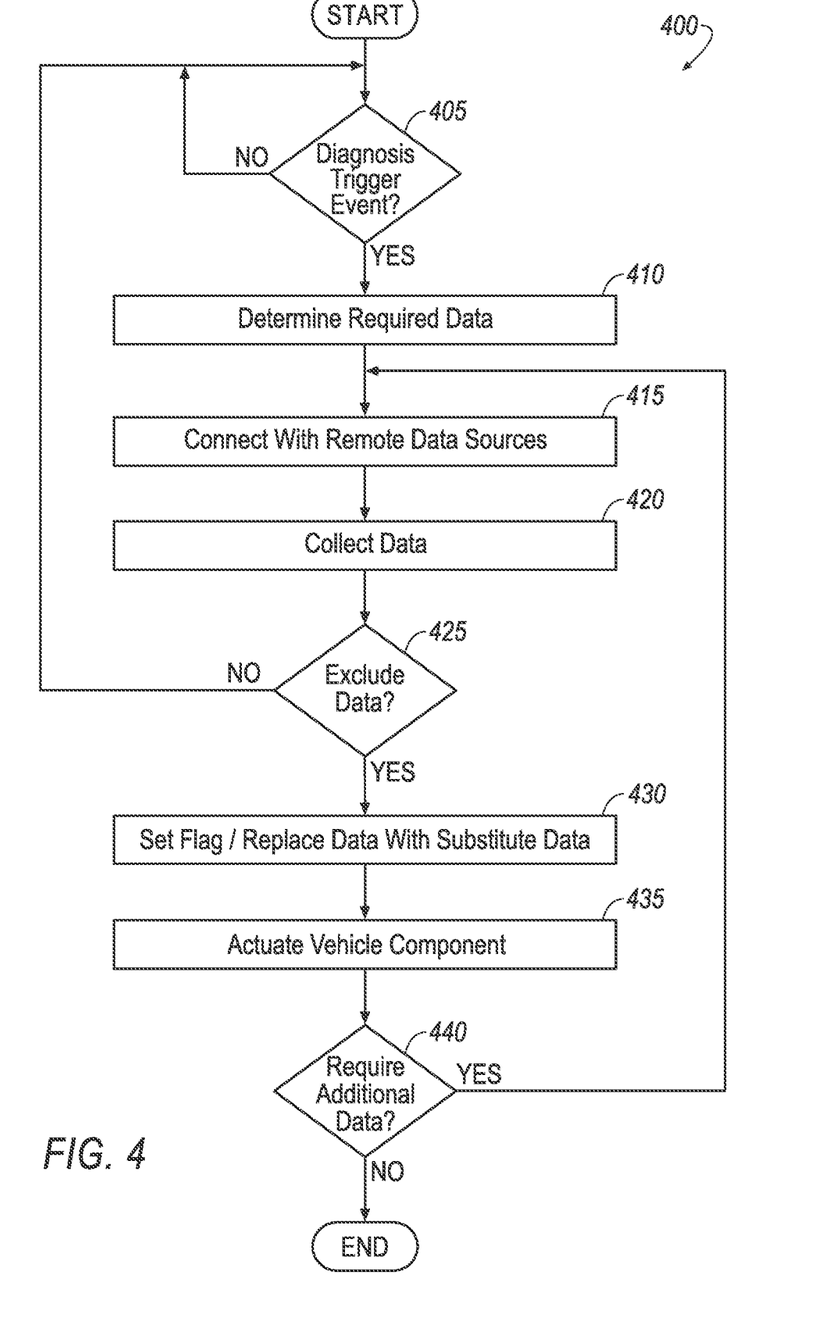
FIG. 4 is a diagram of an exemplary process for evaluating on-board sensors on a first vehicle based on data from remote sensors.

FIG. 4 is a diagram of an exemplary process 400 for evaluating on-board sensors 30*a* on a first vehicle 12*a* based on remote data, i.e., from sensors 30*b* in second vehicles 12*b*, sensors 40 in an infrastructure device 16 and data from data sources 18. The process 400 starts with a block 405.

In the block 405, the computer 32*a* of the first vehicle 12*a* determines whether a trigger event has occurred to initiate a diagnosis of data from the sensors 30*a* in the first vehicle 12*a*. The computer 32*a* may be programmed to initiate the diagnosis of the data from the sensors 30*a* upon determining that the first vehicle 12*a* has started, that the first vehicle 12*a* has stopped, that the first vehicle 12*a* has been running for a predetermined period of time since a prior evaluation of data from the sensors 30*a*, that a technician has requested a test of the data from the sensors 30*a* via, e.g., an interface on a CAN bus, etc. As yet another example, the computer 32*a* may be programmed to initiate a diagnosis of data from a sensor 30*a*, when one or more values of data from the sensor 30*a* are determined to be outside of a predetermined value, for example as part of a data plausibility test as is known.

When it is determined that a trigger event has occurred, the process 400 continues in a block 410. Otherwise, the process 400 continues in the block 405.

In the block 410, the computer 32*a* determines the remote data which the computer 32*a* requires in order to perform the evaluation. For example, the trigger event may be a routine trigger event requesting the computer 32*a* to evaluate the data from an air temperature sensor, an air humidity sensor, and an ambient light sensor. Based on the routine trigger event, the computer 32*a* may determine that it requires data from one or more remote air temperature sensors, one or more remote air humidity sensors, and one or more remote ambient light sensors. As another example, the trigger event may be the detection that a data value from a particular sensor 30*a*, for example a road traction sensor, is outside of a predetermined range as part of a plausibility test. Based on the detection, the computer 32*a* may determine that it requires data from one or more remote road traction sensors. Upon determining, by the computer 32*a*, which data are required, the process 400 continues in a block 415.

In the block 415, the computer 32*a* establishes communications with one or more second vehicles 12*b* and/or infrastructure devices 16. For example, the computer 32*a* may, via the communications circuit 34*a*, establish dedicated short range communications with one or more second vehicles 12*b* and/or one or more infrastructure devices 16 in the same geographic area. The same geographic area may be defined, for example, as within one kilometer of the first vehicle 12*a*. Establishing communications with a second vehicle 12*b* and/or infrastructure device 16 may be understood to mean establishing communications respectively with the computer 32*b* in the second vehicle 12*b* and the computer 42 in the infrastructure device 16. Upon establishing communications with the second vehicles 12*b* and infrastructure devices 16, the process 400 continues in a block 420.

In the block 420, the computer 32*a* collects data from the second vehicles 12*b*, infrastructure devices 16, and/or from data sources 18. The computer 32*a* may request a particular type of data, for example air temperature data. Additionally or alternatively, the computer 32*a* may request a category of data, for example weather data, or traffic data. The category of data may include a set of related data. For example, traffic data may include the volume of traffic, the speed of traffic, locations of accidents along a travel path, etc.

The request for data may specify other factors, such as how much data is required, a time frame for the data, etc. For example, for purposes of evaluations, e.g., diagnoses of conditions associated with data, such as faulty, not being received, etc., the computer 32*a* may require data from three or more remote sources in order to have confidence in a statistical analysis. The computer 32a may request data from three second vehicles 12b computers 32b in the same geographic area. Additionally or alternatively, the first vehicle 12a computer 32a may request data from an infrastructure device 16 computer 42 (or second vehicle 12b computer 32b) received over a predetermined period of time, for example, the previous 10 minutes. As another example, the first vehicle 12a computer 32a may request data such as weather data from a data service 18. When the computer 32a receives the requested data, the process 400 continues in a block 425.

In the block 425, the computer 32a determines whether the data from the one or more sensors 30a can be used for first vehicle 12a operations, such as for actuating components of the first vehicle 12a, or alternatively, whether the data should be excluded. The computer 32a analyzes the data from the first vehicle 12a sensors 30a, based on the remote data received from the second vehicles 12b sensors 30b, infrastructure device 16 sensors 40 and other data sources 18. As an example, the computer 32a may receive one data value indicating air temperature from the sensor 30a of the first vehicle 12a and additionally receive two or more remote data values indicating air temperature from two or more other sensors 30b in second vehicles 12b. The computer 32a may perform a statistical analysis on the data values, and generate, for example, statistical values such as a mean air temperature value, an average air temperature value, a standard deviation of the air temperature values, a sample size, etc. from the mean air temperature. When the computer 32a has completed generating the statistical values, the computer 32a may determine whether the data from each of the sensors 30a in the vehicle 12a may be used for vehicle operations or whether the data should be excluded.

For example, based on the mean and standard deviation values determined from the air temperature values, the computer 32a may determine whether the local air temperature data (i.e., from the sensor 30a in the first vehicle 12a) is within a predetermined range of deviation, for example three standard deviations from the mean temperature value. As other examples, the computer 32a may determine whether a data value is within a given percentage of the mean value, for example +/−10%, or within an absolute range, for example within a range of +/−5° Centigrade, of the mean value. In the case that the data from the local sensor 30a is determined to be within the predetermined range, the process 400 continues in the block 405. In the case that the data from the local sensor 30a is determined to be outside of the predetermined range, the process 400 continues in a block 430.

In the block 430, based on the determination that the data from the sensor 30a is outside of the predetermined range, the computer 32a may set a flag indicating that the data should be excluded from first vehicle 12a operations. The computer 32a may further provide an indication to a user. For example, the computer 32a may activate a failure lamp or provide an indication on an LCD display in the first vehicle 12a that a particular sensor 30a is not operating.

Additionally or alternatively, the computer 32a may replace the data determined to be outside of the predetermined range with data received from (or based on data received from) the second vehicles 12b, infrastructure devices 16, and data sources 18 for first vehicle 12a operations. Continuing with the example above, the computer 32a may provide, e.g., a mean temperature value, calculated during the data analysis, to controllers 36a. The process 400 continues in a block 435.

In the block 435, the controllers 36a in the vehicle 12 may actuate one or more components of the first vehicle 12a based on the substituted data received from the computer 32a. The process continues in a block 440.

In the block 440, the computer 32a may determine if additional data is required. For example, based on the analysis described above, the computer 32a may determine that data from a particular sensor should be excluded. The computer 32a may further determine that data of this type is required for proper or optimal first vehicle 12a operation. In this case, the process continues in the block 415.

Conversely, the computer 32a may determine, e.g., that the first vehicle 12a has been turned off, or that the first vehicle 12a may function satisfactorily without this data. In this case, the process 400 may end.

Figure 5:
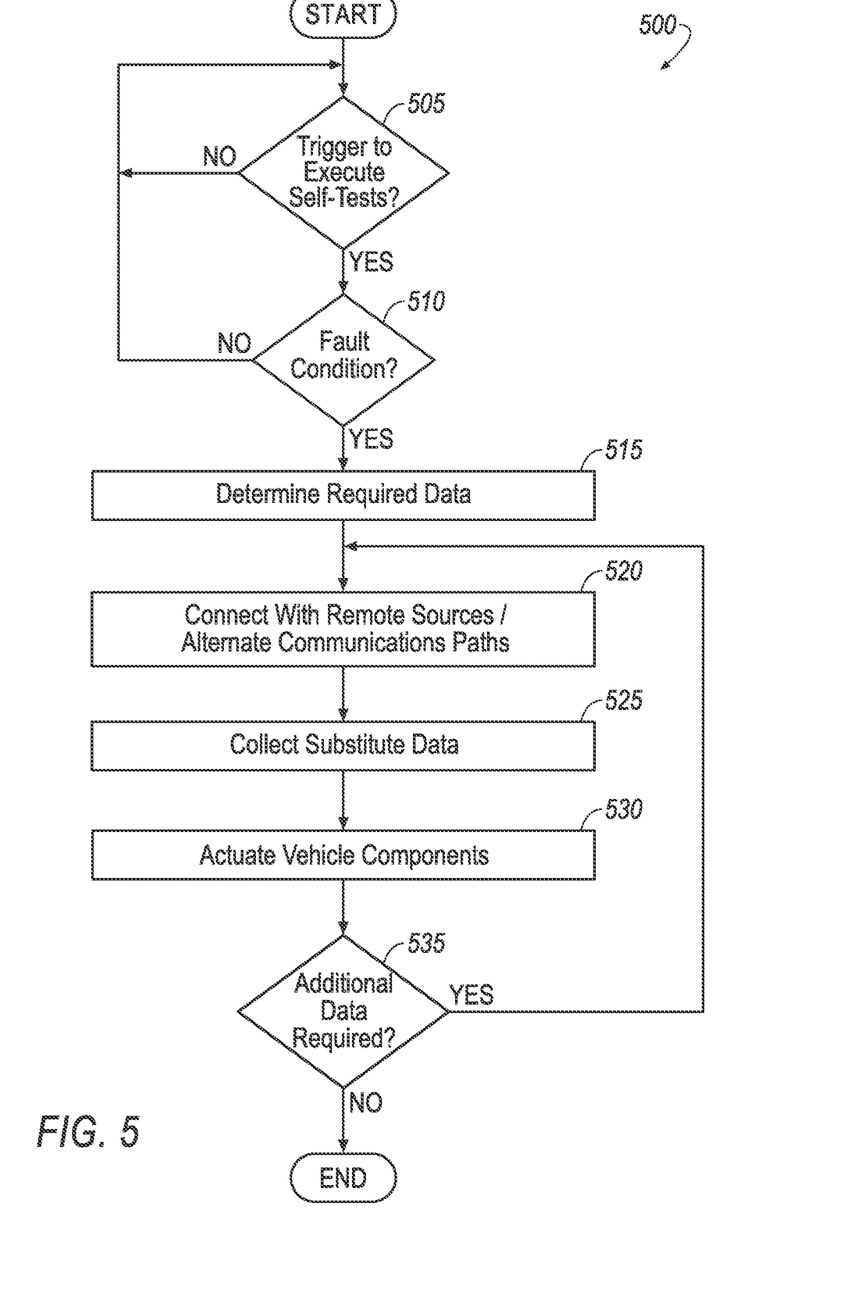
FIG. 5 is a diagram of an exemplary process for replacing data received from a first data collector with data received from a second data collector for actuating first vehicle components.

FIG. 5 is a diagram of an exemplary process 500 for replacing data received from a first data collector with data received from a second data collector for use in first vehicle 12a operations. The term "data collector," as used herein, refers to a sensor 30a in the first vehicle 12a or a portion of the communications circuit 34a, e.g., a receiver, in the first vehicle 12a. The process 500 starts in a block 505.

In the block 505, the computer 32a identifies whether a trigger to perform a diagnostic test of sensors 30a and/or the communications circuit 34a has occurred. The computer 32a may be programmed to initiate a diagnostic test when it determines, for example, that the first vehicle 12a has been turned on, when the first vehicle 12a has been turned off, when the first vehicle 12a has been operating for a predetermined period of time, when a technician, via, e.g., a CAN bus interface, requests that a diagnostic test be performed, etc. Upon identification of the trigger event by the computer 32a, the process 500 may continue in a block 510. Otherwise, the process 500 may continue in the block 505.

In the block 510, the computer 32a determines, based on first vehicle 12a self-diagnostic tests whether one or more sensors 30a, and/or whether one or more portions of the communications circuit 34a used to receive data for the first vehicle 12a are non-operational. For example, the first vehicle 12a computer 32a may, upon starting the first vehicle 12a, execute one or more diagnostic tests respectively for one or more sensors 30a. The diagnostic tests, as are known, may test the connectivity of the sensors 30a (i.e., that they are properly connected to power supplies, communications busses, etc.), test the sensitivity of the sensors is within a predetermined range, test that the power consumption is within a predetermined range, etc. The first vehicle 12a may further execute one or more diagnostic tests, as are known, for portions of the communications circuit 34a that receive data required for operation of the first vehicle 12a.

Based on the diagnostic tests, the computer 32a may determine that one or more sensors 30a are non-operational, and that the data from the non-functional sensor 30a needs to be sourced from another sensor, remote to the first vehicle 12a (e.g., a sensor 30b in a second vehicle 12b, a data collector 40 in an infrastructure device 16, data from a data source 18, etc.). Additionally or alternatively, the computer 32a may determine that a portion of the communications element 34a used to receive data is non-operational, and the data needs to be obtained via an alternate portion of the communications element 34a.

In the case that the computer 32a, based on the diagnostic tests, identifies data that needs to be sourced from a remote source (sensor 30b in a second vehicle 12b, sensor 40 in an infrastructure device 16 or data source 18), or via an alternative transmission path, the process 500 continues in a block 515. Conversely, in the case that the computer 32*a*, based on the diagnostic tests, that no data needs to be sourced from a remote data collector or via an alternative transmission path, the process 500 continues in the block 505.

In the block 515, the computer 32*a* determines, based on the diagnostic tests, which data needs to be sourced via an alternative portion of the communications circuit 34*a* or from another source remote to the first vehicle 12*a*. For example, if the computer 32*a*, in the block 510 determines that a first receiver in the communications circuit 34*a* used to receive traffic data from a data source 18 is non-operational, the computer 32*a* determines that it needs to either receive the traffic data via a second receiver in the communication circuit 34*a*. The second receiver may receive the traffic data from the data source 18 indirectly, e.g., via the computer 42 in an infrastructure device 16. As another example, if the computer 32*a* determines that an air temperature sensor 30*a* associated with an air intake is non-operational, the computer 32*a* may determine that it requires air temperature data from a remote source (sensor 30*b* in a second vehicle 12*b*, sensor 40 in an infrastructure device 16 or data source 18). The process continues in a block 520.

In the block 520, the computer 32*a* connects with one or more remote data sources and/or activates a second portion of the communications circuit 34*a* to receive data. For example, the computer 32*a* may, via the communications circuit 34*a*, establish dedicated short range communications with one or more second vehicles 12*b* and one or more infrastructure devices 16 in the same geographic area. The same geographic area may be defined, as an example, as within one kilometer of the host vehicle 12*b*. Additionally or alternatively, the compute 32*a* may activate a second receiver in the communications circuit 34*a*. The second receiver may establish communications, e.g., with the infrastructure device 16 computer 42. The infrastructure device 16 computer 42 may provide a communications link, for example, between the first vehicle 12*a* and the data source 18 providing traffic data (as discussed in the previous paragraph). Upon establishing communications with the second vehicles 12*b*, infrastructure devices 16 and/or other sources of data 18, the process 500 continues in a block 525.

In the block 525, the computer 32*a* collects substitute data from the one or more remote sources and/or via the one or more alternative portions of the communications circuit 34*a*. The computer 32*a* requests the particular type of data required to replace the data which is unavailable. For example, the computer 32*a* may request air temperature data from a second vehicle 12*b* in the same geographic area as the first vehicle 12*a*. As another example, the computer 32*a* may request that, for example, an infrastructure device 16 provide a communications link for obtaining traffic data, i.e., that the infrastructure device 16 collect data from the data source 18 and transmit, e.g., via DSRC, the traffic data to the first vehicle 12*a*.

The request for data may specify other factors, such as how much data is required, a time frame for the data, etc. For example, the computer 32*a* may request that a second vehicle 12*b*, travelling in the same direction and in the same geographic area as the first vehicle 12*a*, provide air temperature data regularly, and on an on-going basis. Regularly may be, for example, once per minute, or once every 10 minutes. As another example, the computer 32*a* may request a one-time update on the traffic conditions along an intended path of travel. When the computer 32*a* receives the requested data, the process 500 continues in a block 530.

In the block 530, first vehicle 12*a* controllers 36*a* may actuate components based on the substitute data. Additionally, the computer 32*a* may, for example, update interfaces based on the data. The computer 32*a* may provide the substitute data, received from the remote sources, or via the alternate portion of the communications circuit 34*a*, to the vehicle controllers 36*a* or other vehicle components. The vehicle controllers 36*a* or other vehicle components may utilize the data to adjust vehicle operating parameters and/or actuate vehicle components. For example, the computer 32*a* may provide air temperature data received from a second vehicle 12*b* to an engine controller 36*a* in the first vehicle 12*a*. The engine controller 36*a* may adjust an engine operating parameter such as ignition spark timing, a fuel injection rate, etc. based on the air temperature data. As another example, the computer 32*a* may provide traffic data to a global positioning system in the first vehicle 12*a*. The global position system may update a traffic display based on the received data. As yet another example, the computer 32*a* may display warning symbols, indicating, for example that a particular sensor 30*a* or portion of the communications circuit 34*a* is non-operational on an operator interface. When the first vehicle 12*a* operating parameters have been adjusted, the displays updated and components actuated based on the substituted data, the process 500 continues in a block 535.

In the block 535, the computer 32*a* determines whether additional data is required. For example, the computer 32*a* may determine that the first vehicle 12*a* is still operating, and that the engine controller 36*a* requires updated air temperature data on an on-going basis, or that the computer 32*a* needs to continue to retrieve traffic data via the alternate transmission path. In this case, the process 500 continues in the block 520. Conversely, the computer 32*a* may determine, for example, that the first vehicle 12*a* has been turned off, and that no additional data is required by vehicle controllers 36*a* or other components. In this case, the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory.

Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising a first computing device including a processor and a memory, the memory storing instructions executable by the processor such that the processor is programmed to:
   receive a first data value from a first data collector in a first vehicle as an input to operate the first vehicle;
   determine to exclude the first data value as the input to operate the first vehicle;
   receive a second data value from a second data collector as the input to operate the first vehicle, the second data collector being remote to the first vehicle;
   replace the first data value with the second data value and actuate a first vehicle component based in part on the second data value.

2. The system of claim 1, wherein the first data collector includes a first sensor in the first vehicle and the second data collector includes a second sensor remote to the first vehicle.

3. The system of claim 2, wherein the second data collector is within a same geographic area as the first vehicle.

4. The system of claim 1, wherein determining to exclude the first data value as the input is based on a determination that the first data collector is non-operational.

5. The system of claim 1 wherein determining to exclude the first data value as the input is based on a determination that the first data value is outside of a predetermined range.

6. The system of claim 1, wherein the second data value is received from at least one of a second vehicle within the same geographic area as the first vehicle and an infrastructure device within the same geographic area as the first vehicle.

7. The system of claim 6, wherein the at least one of the second vehicle and the infrastructure device includes the second data collector.

8. The system of claim 1, wherein the processor is further programmed to:
   identify at least one of a second vehicle within the same geographic area as the first vehicle and an infrastructure device within the same geographic area as the first vehicle; and
   request the second data value from the at least one of the second vehicle and the infrastructure device.

9. The system of claim 1, wherein the processor is further programmed to:
   receive at least a third data value respectively from at least a third data collector remote to the first vehicle, wherein determining to exclude the first data value as the input is based on a statistical analysis of the first, second and at least third data values.

10. The system of claim 9, wherein actuating the first vehicle component is further based at least in part on the third data value.

11. The system of claim 1, wherein the first data collector is a first radio frequency receiver included in the first vehicle and the second data collector is a second radio frequency receiver included in the first vehicle and the processor is further programmed to:
    determine that the first radio frequency receiver is non-operational; and
    receive the second data value from the second radio frequency receiver.

12. The system of claim 11, wherein the processor is further programmed to:
    identify at least one of a second vehicle within the same geographic area as the first vehicle and an infrastructure device within the same geographic area as the first vehicle, the one of the second vehicle and the infrastructure device including a second computer programmed to communicate with the second radio frequency receiver; and
    request the second data value from the second computer.

13. A system comprising a first computing device including a processor and a memory, the memory storing instructions executable by the processor such that the processor is programmed to:
    receive a first data value of a parameter from a first sensor included in a first vehicle;
    receive at least second and third data values of the parameter respectively from at least second and third sensors remote from the first vehicle; and
    determine, based at least in part on a comparison of the first data value to the second and third values to exclude the first data value as the input to operate the first vehicle.

14. The system of claim 13, wherein the second and third sensors are within the same geographic area as the first vehicle.

15. The system of claim 13, wherein at least one of the second and third sensors is included in one of a second vehicle and an infrastructure device.

16. The system of claim 13, further comprising a second computer remote from the first vehicle, the second computer including a second processor and a second memory, the second memory storing instructions executable by the second processor such that the second processor is programmed to:

receive the second data value from the second sensor; and transmit the second data value to the first computer, wherein the second sensor is remote from the second computer.

17. The system of claim 13, further comprising a second computer remote from the first vehicle, the second computer including a second processor and a second memory, the second memory storing instructions executable by the second processor such that the second processor is programmed to:

receive the second data value from the second sensor; and transmit the second data value to the first computer, wherein the second computer is included in one of a second vehicle and an infrastructure device.

18. The system of claim 17, wherein the second processor is further programmed to:

store the second value;

receive a request from the first computer to transmit the second value to the second computer; and transmit the second value based at least in part on the request.

19. A method comprising:

receiving, by a computer in a first vehicle, a first data value from a first data collector included in the first vehicle as an input to operate a first vehicle;

determining to exclude the first data value as the input to operate the first vehicle;

receiving a second data value from a second data collector as the input to operate the vehicle, the second data collector being remote to the first vehicle;

replacing the first data value with the second data value; and actuating a first vehicle component based in part on the second data value.

20. The method of claim 19, wherein the first data collector includes a first sensor included in the first vehicle and the second data collector includes a second sensor remote to the first vehicle.

21. The method of claim 19, further comprising:

identifying at least one of a second vehicle within the same geographic area as the first vehicle and an infrastructure device within the same geographic area as the first vehicle; and requesting the second data value from the at least one of the second vehicle and the infrastructure device.

22. The system of claim 19, further comprising:

receiving at least a third data value respectively from at least a third data collector remote to the first vehicle, wherein determining to exclude the first data value as the input is based on a statistical analysis of the first, second and at least third data values.

* * * * *